DEPOSITED MAGNETIC MEMORY ARRAY
Filed May 21, 1959 3 Sheets-Sheet 1
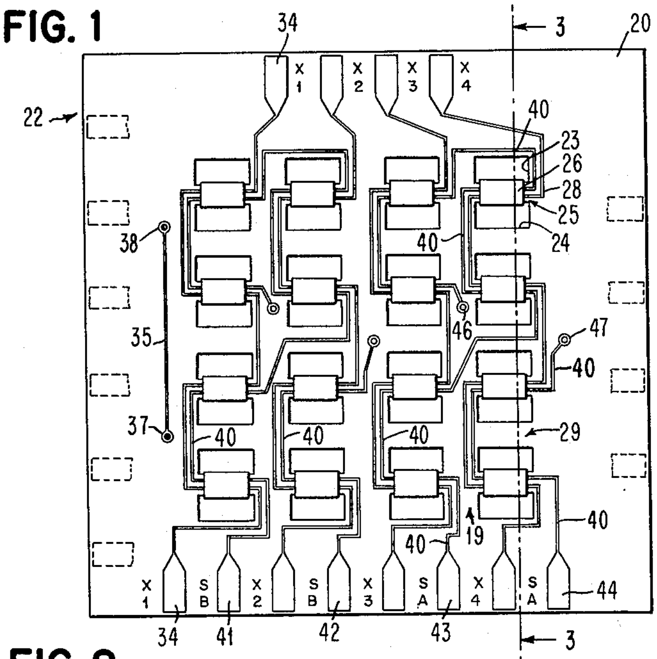
FIG. 2
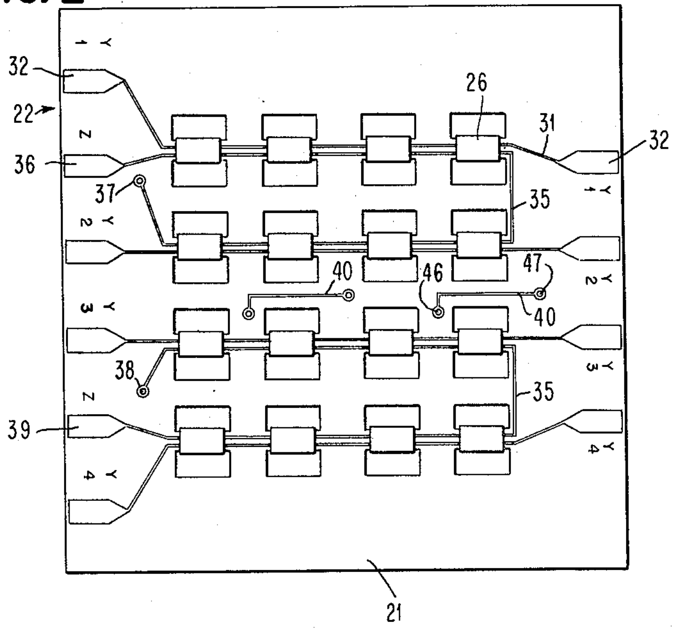
FIG. 3
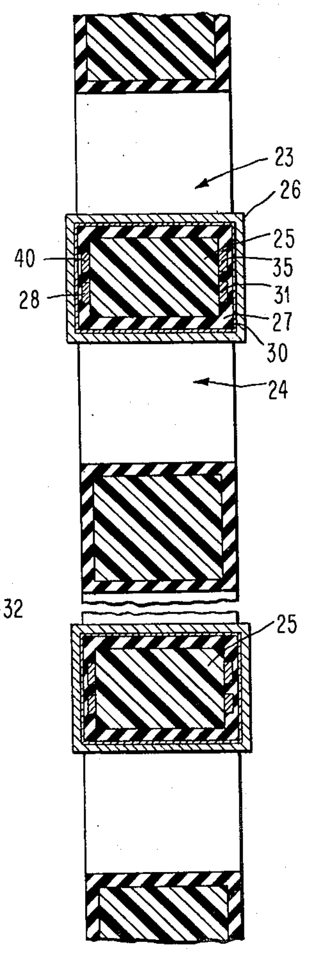
*INVENTORS*
KENNETH F. GREENE
BRUNO J. RONKESE
EDWARD B. CHAPMAN
BY
J W Armbruster
*ATTORNEY*

United States Patent Office 3,138,785
Patented June 23, 1964

3,138,785
DEPOSITED MAGNETIC MEMORY ARRAY

Edward B. Chapman, Poughkeepsie, Kenneth F. Greene, Wappingers Falls, and Bruno J. Ronkese, Marlboro, N.Y., assignors to International Business Machines Corporation, New York, N.Y., a corporation of New York Filed May 21, 1959, Ser. No. 814,772
2 Claims. (Cl. 340—174)

This invention relates generally to the production of a magnetic memory core element by an electroplating process and more particularly to the simultaneous plating of a whole array or matrix of magnetic storage elements directly on a printed circuit board bearing conductor lines and terminals for supplying electrical current and pulses for driving, switching and reading the cores with associated windings such as write, inhibit and sense windings.

Heretofore, the core windings or conductor lines were in the form of wires, and the cores were shaped as separate toroidal elements necessitating a tedious and complicated manual or mechanical threading operation. A core array often involved thousands of tiny cores and wire threading of such small and fragile devices became costly no matter how skillfully or automatically the wire insertion was performed. Now it is proposed that both wires and cores no longer be constructed or used as separate elements, but instead, a substitute for the wires is to be provided in the form of printed circuit lines which are formed rapidly in quantities and in the proper close and modular formation to receive cores, and then also all the cores are to be plated in place all over a board and directly around the previously formed windings so that after the core plating operation is completed, the whole core plane, array or matrix is finished.

In order to produce an operative and commercially acceptable core memory device of this improved type, it was necessary to form a substrate and a printed circuit formation thereon in a new and improved fashion to be not only receptive to the core formations but also to function therewith. Another hurdle overcome was that of so plating magnetic material relative to the printed circuit lines and of the effective square or rectangular hysteresis loop characteristics, so that driving current for memory controlling, sensing and writing purposes, when directed through the printed circuit lines, is effective for magnetic core switching.

Magnetic cores having rectangular hysteresis characteristics are employed for memory purposes and are conventionally arranged in rows and columns with wire windings passing through the cores in each individual row and in each individual column to be used for selection of a particular core in a selected plane or group of planes by coincident energization of single column and row windings. Each single plane is provided with a third winding comprising a sense winding that links each core of the plane in one or the other polarity sense or in alternate sense or with half the cores in one sense and half in the other sense so as to balance out the effects of those cores that are only partially excited by one or the other winding during coincident energization of a row and column winding to select a particular core for interrogation. In a three dimensional array, each plane of cores is also provided with a fourth winding conventionally termed the inhibit winding that is selectively pulsed during a write interval to prevent the combined effects of the magnetomotive forces provided by the row and column windings from causing a change in remanence state of the core in that plane when writing or rewriting information or binary characters in the array. In an instance of application, like positioned cores in the several stacked two dimensional array planes, comprise bits of a binary word and the similar row and column windings of each bit plane are series connected so that on energization of these windings in coincidence, the core in each plane linked thereby would attain a one representing remanence state unless inhibited by pulsing the fourth winding individual to that plane.

Heretofore, magnetic core arrays of the type described have been assembled manually with the windings threaded through the cores and providing support therefor in the completed matrix. This means of assembly has become increasingly time consuming and expensive since arrays of greater capacity requiring a large number of cores are used, with the tendency being toward increasing bit capacity and use of smaller sized cores.

The present improvement contemplates an additive or plating process yielding printed circuit conductors and core windings wherein the assembly of a memory core array is produced rapidly and automatically in an economical high speed process. The method is based upon the use of conductive and magnetic electrolytes in plating baths used in succession and between stop off resist pattern deposits to place patterns of conductors and cores in proper succession on ceramic or plastic nonconductive substrates of unique formation. Although clad boards are a possibility it is also clear that an additive film of sprayed copper or other chemically deposited metal may be followed by subsequent build up by plating with copper, or other conductive material to form permanent conductor lines on the surface of the molded or cut plastic core receiving plate or board. It is to be understood that such conducting lines on the board are present on both sides of the board and extend to the edges of one or more sides of both faces of the board whereat terminal formations may be formed for reception of soldered or clamped lead wires, common vertical rods or bars, or other terminal formations which extend into machine proper for reception of the impulses which control the reading, writing and inhibiting controls over the core array.

An object of the invention is to provide a method for assembling a magnetic core array obviating the need for threading wire conductors through the cores by hand.

Another object of the invention is to provide an electroplating process for formation of magnetic core arrays, said process being adapted for rapid automatic and economical operation of complete array fabrication.

Another object of the invention is to provide an improved method of embodying printed circuit windings in a magnetic core matrix.

A further object of the invention is to provide a process combining the best features of electrodeposition operation with additive printed circuit techniques for the purpose of providing an improved automatically formed magnetic core matrix.

A still further object of the invention is the provision of a novel form of packaging involving the electroplating of electronic components in such a fashion as to render them receptive to complete wiring and connection by printed circuit techniques without need of any subsequent connections by other operations.

Another object of the invention is to so control the plating of the magnetic material as to establish a very thin magnetic core coating and to further control so that the crystal formation of the structure of such a coating is to be oriented to improve the characteristics for magnetic retentivity. It was found that by establishing a magnetic field in the plated core area while plating, the proper domain or crystal formation is established.

An object of the invention is the production of both magnetic core memory devices and the associated windings by means of additive printed circuit processes.

Another object of the invention is the provision of a printed circuit board so arranged as to be receptive to a memory device deposited directly thereon.

Another object of the invention is the provision of a method of electroplating an entire memory core array in a single operation.

A still further object of the invention is the provision of an article of manufacture in the form of a perforated printed circuit board carrying a plurality of conductor lines so grouped as to be focused by the board perforations and arranged there in narrow elongated nodular groups for reception of memory material deposited in association with such focused lines.

The foregoing and other objects, features and advantages of the invention will be apparent from the following more particular description of a preferred embodiment of the invention, as illustrated in the accompanying drawings.

In the drawings:

FIG. 1 is a plan view of an array of 16 plated cores formed on a printed circuit board.

FIG. 2 is a reverse side plan view of the board of FIG. 1.

FIG. 3 is a sectional view taken along line 3—3 in FIG. 1 and showing a cross section area of the board, the conductor lines thereon and the layers of resin and magnetic material plated around the lines.

Figure 7:
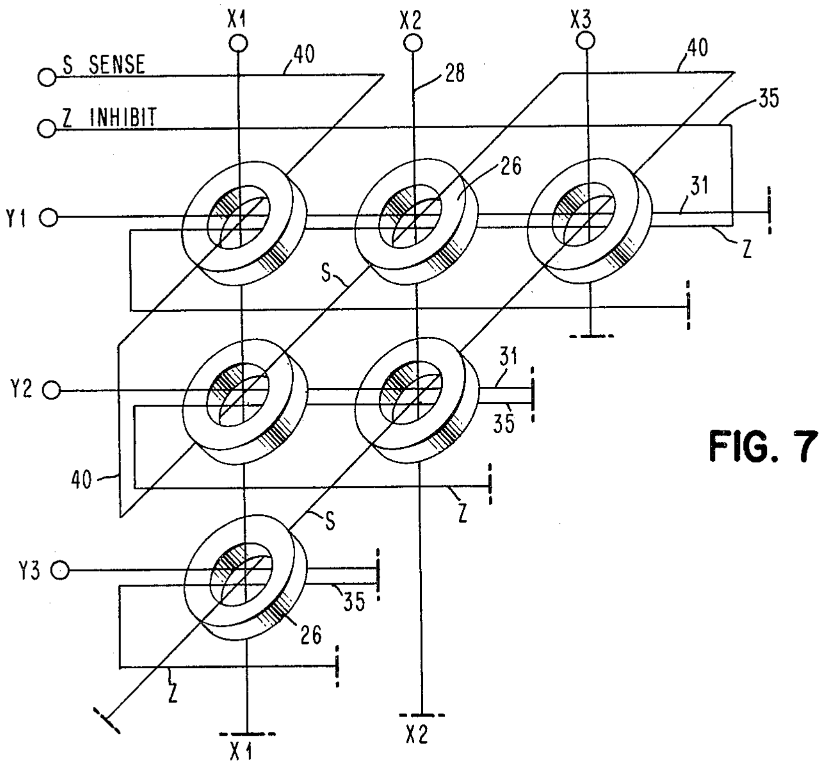
FIG. 7 is a diagrammatic perspective view showing a number of cores in an array and the fashion in which the windings are directed therethrough.

A single plane of a typical three dimensional array of magnetic core is shown in FIG. 7 where toroidal cores 26 are shown arranged in rows and columns, as aforementioned, and linked by column windings X and row windings Y. Such an array is illustrated, for example, in an article entitled "Ferrites Speed Digital Computers" by D. R. Brown and E. Albers-Schoenberg, appearing on page 146 of Electronics magazine, issue April 1953, and described and claimed in the application of E. W. Bauer and M. K. Haynes, Serial No. 443,284, filed July 14, 1954, now Patent No. 2,889,540, which application is assigned to a common assignee.

In such an arrangement a particular core is selected for reading by the simultaneous energization of that X and that Y selection line or winding that embraces that particular core. The current pulse on each line provides a magnetomotive force to each core that it links, which force is less than the coercive force, and the single core energized by both windings then receives double the force. The selected core is thus caused to change from a binary one representing remanence state to a zero remanence state, if it held a binary one representation, and this flux change develops an induced voltage in a sense winding S indicating this fact. If a zero remanence state had been stored in the interrogated core, little flux change takes place and the sense winding signal is of low value so that storage of ones and zeros may be distinguished. Writing or storing a binary one state is similar to a reading operation but with the sense of the X and Y drive pulses reversed to cause the selected core located at the winding intersection to change from a zero remanence state to the one remanence state. This change also induces a voltage in the sense winding S but it is disregarded at write time by means of a gate (not shown). Writing a zero may be accomplished in a two dimensional array by failure to apply the X and Y write direction pulses in coincidence; and in a three dimensional array, where the X and Y lines link like positioned cores of plural planes to define words of plural bits, the X and Y line pulses may be applied in coincidence but their effect counteracted in selected planes, where zeros are desired, by pulsing an inhibit winding Z in that bit plane. The X, Y, S and Z windings are shown in FIG. 7 and it is to be noted that the inhibit winding links all the cores in the same sense while the sense winding S links the cores in alternate diagonals in an opposite sense. The winding pattern of the sense winding as shown is such as to provide a bidirectional output signal but, since those cores that are linked only by the selected X or selected Y winding alone and are partially excited contribute some output signal on interrogation, the effects of non-selected cores tend to cancel one another. Many other sense winding configurations are feasible wherein the half select signals are counterbalanced, as for example the arrangement shown in FIG. 1, and the particular form of array shown in FIG. 7 or FIG. 1 is not to be considered limiting with respect to the printed circuit assembly shown hereafter.

FIGS. 1 and 2 show both sides or faces 20 and 21 of a board, substrate or memory plane 22 which is molded, formed or cut square in shape and provided with sixteen pairs of adjacent perforations 23 and 24. It is noted that these sixteen pairs of perforations, openings or apertures 23, 24 are arranged with regular spacing and aligned in horizontal rows and vertical columns of a 4 × 4 matrix or array.

Between each pair of openings 23–24 there is a narrow strip or grid area of board material 25 which constitutes a memory module and bears the ring of magnetic core material 26 under which is a thin copper film 30 (a chemical or vacuum metallized deposit of about .000010 inch) and an epoxy resin coat 27 (FIG. 3) and then the conductors 28 over an adhesive on the board. Wider areas or strips 19 and 29 are between openings 23, 24 which are not of a pair and provide strength and room for conductor connection paths. It is contemplated that many or all unrelated adjoining perforations could be made as one to condense the board further and eliminate punches or fabrication (i.e., three openings could have two cores on the intervening strips).

As seen in FIG. 1 the X conductor lines 28, as core write or selection bias lines or windings, are of a form or path which winds more or less directly across the board 22. For example, line X1—X1 at the left is seen to wind in and out through the four cores of the left column. In a similar fashion, all four X lines X1–X4 are seen to follow a generally vertical path across the board and through the related cores of columns one to four.

On the opposite face 21 of board 22 (FIG. 2) the Y selection or bias lines 31 are seen to have rather direct horizontal paths, each through four cores 26 of a horizontal row. Widened terminal tabs 32 are at the board edges just as the X line tabs 34 are near the other edges.

In FIG. 2 an inhibit Z line 35 is seen to originate at tab 36, cross to the right through four cores and then cross back to the left through the second horizontal row of cores before going through hole 37 to the other side of the board. In FIG. 1 it is noted that Z line 35 appears between holes 37 and 38. On FIG. 2 the Z line 35 reappears at hole 38 and winds across to the right and back to terminal 39.

The two "sense" or read bias lines 40, FIG. 1, are seen to have tortuous paths between terminals 41–42 and 43–44. If the start is assumed at tab 43, a sense winding 40 is seen to pass zigzag through the two lower cores of the third column, then diagonally upward and to the right through the two upper cores of the fourth column, before descending through the two upper cores of the third column, passing through hole 46, reappearing at hole 47, and finally winding through the lower two cores of the fourth column and ending at tab 44. The other sense winding 40 at the left between tabs 41 and 42 follows a similar path through the first two columns of cores.

It is important to note that all four types of windings have been arranged through the cores without any of the windings crossing their own or any other winding. Although it is possible for printed circuit lines to be deposited or crossed over other previously arranged lines, it is much simpler and more economical to deposit all lines at once in one layer on each side of the board.

Figure 6:
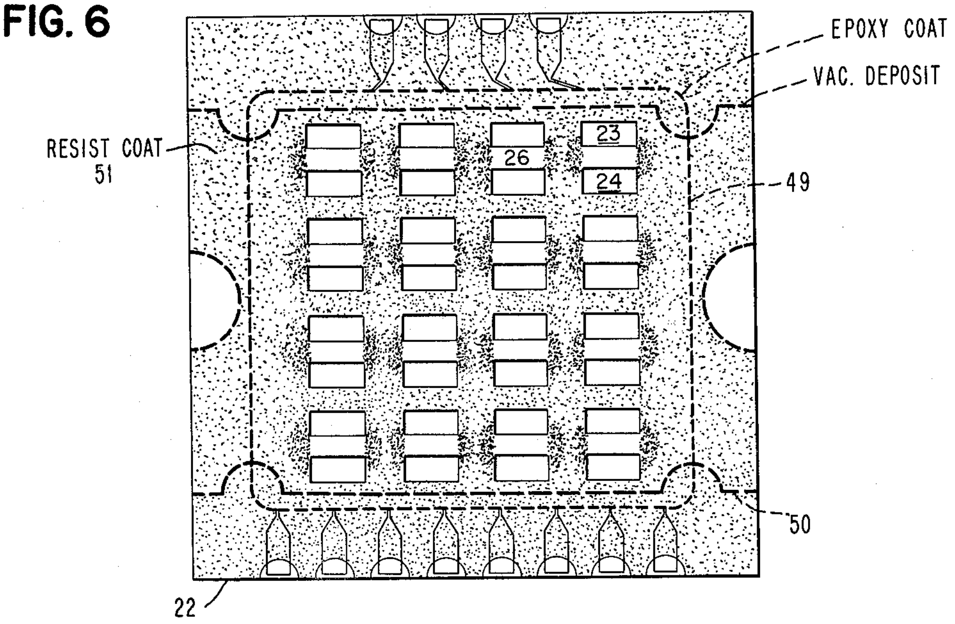
FIG. 6 is a plan view of a board after successive steps of placing conductors thereon, an epoxy resin coat, a vacuum deposited layer of copper and a pattern of resist just prior to plating the core material.

Before outlining the gist of the artwork technique, it is well to note the shapes of the various coatings or layers as shown in FIG. 6, in addition to the printed conductor lines 28, 31, 35 and 40 already noted with respect to FIGS. 1 and 2. Although FIG. 6 is shown with the board 22 in its finished outline of square shape and formations of only sixteen pairs of holes 23, 24, it is to be realized that other breakaway board extensions and locating holes may be provided to aid in registration of the various patterns of stencils and resists.

After the printed circuit lines and terminal tabs are placed on both faces of the board, thin coats of an epoxy resin or another thermoplastic or thermosetting plastic or varnish are applied in the shape 49, mainly to coat the conductors in the areas where the electroplated NiFe is to be superimposed later. Over the epoxy coat there is added a thin film of adhesive which is the undercoat for a film of copper. Over the epoxy and adhesive coat 49 there is applied a vacuum deposited film 50 of copper about .000010 in thickness and extending to at least one board edge. This copper film 50 is to form a receptive undercoat for the magnetic NiFe and also provide a conductive layer at the board edge for terminal clamps to electrically connect the board as the receiving cathode in the electrolyte for the NiFe plating. Since there is to be at least one winding through each core conducting a current to cause a magnetic orienting field at each core area at the same time as the electroplating of NiFe, it is necessary to keep the windings and the copper film 50 insulated, and that is what is done by the epoxy coat 49.

In order to limit the NiFe core deposits to the restricted cylindrical areas, a resist coating 51 is applied to all the board except where terminals are to grasp tabs, the edges of copper coat 50, and the areas for the cores 26. The stippled areas in FIG. 6 represent the resist coated areas before NiFe plating. There are two ways in which the resist coat may be applied near the core areas 26; it may or may not cover the three side walls of the openings 23 and 24 away from the core area. If the resist is applied to the opening walls, then there is no extraneous NiFe deposits outside the core area. However, if resist 51 is only applied to the faces of board 22, then a shearing die removal, or other edge cutting, grinding or filing etc., operation is required to remove deposits outside the cylindrical core area.

It is to be understood that the showings in the drawings FIGS. 1–4 are necessarily out of proportion because they are for illustrative purposes so that strip 25 could be actually of a more elongated form with a length about 3 or 4 times its width. The deposits and plating thicknesses of FIG. 3 are also merely illustrative and the ranges of dimensions are to be noted as given here.

Board thickness of about .031–.062 inch
Conductor thickness, .0005 to .0015
Conductor width, about .010 and .010 spacing
Insulator coating such as epoxy resin coat, about .001
Plated magnetic core, about .002 to .00025
Percent iron in plating, 25 to 65% iron and 75 to 35% nickel
Core diameter, .040 to .060, somewhat square or rectangular
Core length, .125 to .187
Board of 4×4 cores, 2¾" square Of course, the foregoing figures are examples only and not to be regarded as limitations, as it is realized that many variations may be made without departing from the spirit of the invention.

First, the steps of entire general artwork techniques may be stated. Then this may be followed by an example of an additive printed circuit method. Finally, examples of magnetic material plating baths and procedures are to be presented.

The general artwork techniques:

(1) Start—use glass or ceramic base material with core holes and conductor grooves pre-molded.
(2) Metallize base as with vacuum or chemically deposited copper.
(3) Mask by photo resist and collimated light leaving conductor areas uncoated.
(4) Electroplate conductor lines with copper.
(5) Remove masking ink and background copper film.
(6) Apply insulating coating to board. Dry.
(7) Metallize the board.
(8) Mask with photo resist and collimated light, coating all surface areas except desired core areas.
(9) Electroplate core areas with nickel-iron. During plating, conductor lines carry current to generate an orienting magnetic field for the depositing core material.
(10) Remove photo resist.

Another technique is as follows:

(1) Start with a double clad epoxy paper (or any stable ceramic like stock).
(2) Punch registration holes (mold or form in the case of a ceramic).
(3) Punch through holes (molded in the case of glass or ceramic).
(4) Metallize card, copper chemical or vacuum metallizing on board and through the holes.
(5) Negative pattern of resist for conductors.
(6) Plate conductors and through holes.
(7) Remove resist.
(8) Punch core holes.
(9) Etch card.
(10) Apply epoxy insulating coating.
(11) Dip in very thin adhesive Armstrong N–178, bake.
(12) Metallize with film of copper.
(13) Core pattern defined by resist over other areas.
(14) Plate NiFe.
(15) Remove resist.
(16) Punch to size (punch out part of core hole when not stopped off by resist around opening edges).

Above total of:

2 metallizing steps
2 screening steps
2 plating steps

As an example of a method of forming the underlying printed circuit conductors or core winding lines of the present invention, the following procedures may be followed.

(1) Start with an unclad board.
(2) Cut the board to size and punch holes large enough for terminals.
(3) Clean the board with a solvent such as methyl ethyl ketone.
(4) Spray an adhesive on both sides and inside holes—Armstrong N–178.
(5) Dry adhesive in an oven, one-half hour at 200° F.
(6) Vacuum metallize with copper film while board is rotating. Entire board is coated with copper film of a thickness approximately 0.000005 of an inch.
(7) Silk screen a negative of the desired pattern on the board, Resist-Photocircuits K2.
(8) Copper electroplate the board to a conductor thickness of about 0.0015 of an inch, between resist areas, there being at times a progressively low and high current density plating in the same bath.
(9) Remove resist as by degreasing.
(10) Remove background of vacuum deposit copper film and adhesive by chromic and sulphuric acid etching compound with a scrubbing action which is mainly to remove the adhesive. The background copper film is chemically dissolved by the etch solution and the scrubbing action is used to facilitate removal of the adhesive by the etch. The relatively thick conductor lines are etched to a slight extent which does not impair their eventual use. It is estimated that the copper film is taken off in three seconds and the scrubbing requires two minutes.

(11) Cure remaining adhesive under conductor lines and through holes by baking for one-half hour at 330° F.

From this point on the core plating steps are started.

In addition to the foregoing steps, there are several intermediate rinsing operations.

As alternatives to the etched or additive processes noted hereinbefore, the printed conductors could be formed by a stamped/molded process as set forth in the expired Patent 2,427,144. However, for small core arrays and wherever the conductors are to be thin and close together, the etched process may be preferred.

Magnetic materials having square hysteresis loops have hitherto been found of value in various fields, such as the field of mechanical rectification of alternating current and the field of magnetic amplification. Hysteresis loop tests using direct current testing equipment are well known. A material is said to have a square hysteresis loop if, in such tests, it exhibits a high ratio of residual induction (B*r*) to maximum induction (B*m*). The *Br/Bm* ratio for a given material is not a single value, but varies with the peak magnetizing force and passes through a maximum as saturation is approached. While the terms "square" or "rectangular" as applied to hysteresis loops may be susceptible of wide interpretation, the materials to which this invention is addressed have greater utility the higher the maximum *Br/Bm* ratio becomes; and in general contemplate materials having *Br/Bm* ratio of about 0.90.

High speed digital computing machines have been built using electronic vacuum tubes. While such machines are capable of solving problems of prodigious length and complexity, a serious disadvantage is to be found in the possibility of unpredictable tube failure, making rechecking impossible even though an error is known. The advent of grain oriented nickel-iron alloys characterized by rectangular hysteresis loops provides the possibility of using magnetic cores to replace electronic tubes in the memory units of such computers.

Recent developments in digital computers as well as other electronic devices have necessitated higher rates of magnetization or shorter switching times within the cores than were possible with previously available magnetic devices. Since increasing the rate of magnetization is dependent upon reducing eddy currents, holding the magnetic films to thinner gauges would seem to be indicated. The difficulty is that in materials previously known, in which rectangular loops could be produced for this purpose, such as grain oriented 3% silicon-iron and grain oriented 48% nickel-iron, the coercive force increases rapidly with decreasing thickness and becomes excessive at the ultra-thin gauges required. Any increase in coercive force is undesirable, since it necessitates an increase in the exciting current, which may exceed that available.

Figure 4:
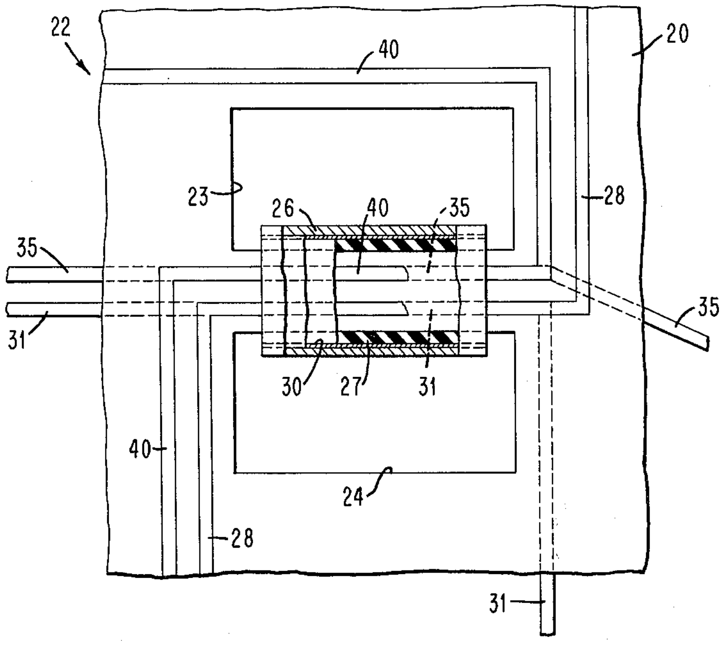
FIG. 4 is an enlarged detail view (partly in section) of a core array opened to show all films or layers of materials.
Figure 5:
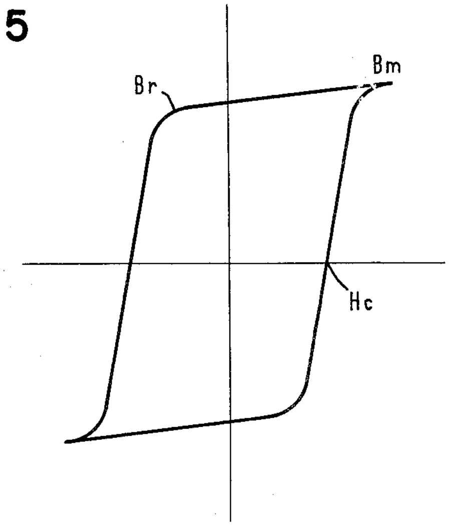
FIG. 5 is an oscillograph depiction of the magnetic loop hysteresis characteristics of the cores of the invention.

FIG. 5 shows a typical rectangular hysteresis loop of the characteristics produced under the conditions of plating NiFe cores on a printed circuit board as outlined herein. The squareness ratio of the loop was found to be good and in the range of .8 to 1. The applied plating current was about 20 A. per square foot of toroidal core area for a time of plating of about 12 minutes. At the same time an orienting magnetic field was applied through core windings at about 2.5 A. for the same period as the plating time. The temperature of the electrolyte was held in the vicinity of 74° F. and a pH of 2.8 to 3.

One electrolyte solution may be given here as an example:

Solution composition:
194 g./1$NiCl_2 \cdot 6H_2O$ (50 g./1Ni)
5.7 g./1$FeCl_2 \cdot 4H_2O$ (1.6 g./1Fe)
9.7 g./1NaCl
25.0 g./1$H_3BO_3$
0.83 g./1 saccharin
0.42 g./1 sodium lauryl sulfate Solution preparation: The nickel chloride, ferrous chloride, sodium chloride and boric acid were dissolved in distilled water. The solution was treated with activated carbon and filtered. After filtration the saccharin and sodium lauryl sulfate were added. The pH was lowered with HCl to 2.7–3.0. All salts used were reagent or U.S.P. grade.

Fluoborate bath:
284 cc./1 nickel fluoborate concentrate
9.6 cc./1 ferrous fluoborate concentrate
0.83 g./1 saccharin
10 g./1$MgCl_26H_2O$ Sulfate bath:
218 g./1$NiSO_4 \cdot 6H_2O$
11.2 g./1$FeSO_4(NH_4)2SO_4 \cdot 6H_2O$
25.0 g./1$H_3BO_3$
0.83 g./1 saccharin
0.42 g./1 sodium lauryl sulfate Chloride bath:
194 g./1$NiCl_2 \cdot 6H_2O$
5.7 g./1$FeCl_2 \cdot 4H_2O$
9.7 g./1NaCl
25.0 g./1$H_3BO_3$
0.83 g./1 saccharin
0.42 g./1 sodium lauryl sulfate Chloride-sulfate bath:
218 g./1$NISO_4 \cdot 6H_2O$
11.2 g./1$FeSO_4(NH_4)2SO_4 \cdot 6H_2O$
140 g./1NaCl
25.0 g./1$H_3BO_3$
0.83 g./1 saccharin
0.42 g./1 sodium lauryl sulfate Magnetic field: The application of a circumferentially directed magnetic field while electroplating has a pronounced effect in squaring the resultant hysteresis loop of the test bit. This is due to alignment of domains in any easy direction during deposition. Bits were plated up to or at 20 oersted average strength magnetic fields. At about 5 oersteds results were good for particular proportions of core deposited. For other sizes, field density would require proportionate variations.

FIGURE 5 shows effect of composition on H*c*, B*r* and *Br/Bm* respectively. Minimum Hc was obtained at a plate composition of about 26% iron.

In order to electroplate the NiFe magnetic coating, which is only one of a variety of such magnetic materials which may be used for the present purpose, note was taken of the above number of solutions or baths which were found effective and suitable for illustrative purposes. It was also found that by using the following electrolyte solution, a magnetic core may be formed by depositing a coating of about .00025 inch thickness on a film of copper over an epoxy resin of about .001 thickness over printed circuit lines which are of heavier copper. The following are three examples of the electrolytes used.

#1. nickel chloride bath:

| | G./l. |
|---|---|
| $N_1Cl_2 \cdot 6H_2O$ | 194 |
| $FeCl_24H_2O$ | 5.7 |
| $H_3BO_3$, boric acid | 25 |
| Saccharin | .83 |
| Sodium lauryl sulphate | .42 |

Room temp., 25° C., pH 2.8–3.

#2. nickel sulphate bath:

| | |
|---|---|
| $NiSO_4$ | 220 |
| $FeSO_4$ | 15 |
| $MgCl_2$, magnesium chloride | 10 |
| $H_3BO_3$, boric acid | 25 |
| Saccharin | 1 |
| Sodium lauryl sulphate | .42 |

115° F., pH 2.5–2.7.
Iron anode or combination NiFe anode.

#3. 50 grams per liter of nickel as nickel fluoborate solution
10 grams per liter of $MgCl_2$
1 gram per liter of saccharine (sic) (soluble)
1 to 1.9 grams per liter of iron as ferrous fluoborate solution Sample platings were made from the above solutions (four iron concentrations of 1.0, 1.3, 1.6 and 1.9 grams per liter of iron) and analyses were made.

Analyses were as follows:

| Iron content in Solution, grams per liter | Nickel content in Plate, percent |
|---|---|
| 1.0 | 81.7–81.0 |
| 1.9 | 77.0–78.3 |

The plating conditions above were, 120° F., pH=2.2 (raised the small pH of nickel fluoborate with $NiCO_3$), 20 amps per sq. ft.=the cathode current density. Separate anodes used were of different metal (80% nickel and 20% iron). The plate thickness about 0.001 inch.

In order that preferred magnetic behavior may be obtained, the nickel iron alloy should have orientations which are favorable for magnetization. Under ordinary plating conditions, the thin magnetic coating would have random crystal formation and failure to be suited for the best results in use as magnetic switching devices.

In the process of plating according to the present invention, the underlying conductor lines of the plated circuit are to be made conductive during plating to create a magnetic field which makes its presence felt in the area or cylindrical formation upon which the magnetic material is being plated. Under such specially arranged conditions of electrolysis a nickel core board can be produced with better magnetic properties because the thin layer has a highly preferred crystal orientation with the (111) plane parallel to the surface. This preferred orientation is sought in order to realize the best magnetic properties sought for magnetic core memory devices.

Heretofore, it was thought that preferred orientation could be realized only in extremely thin formations of magnetic material, however, the less desirable directions of growth are avoided in the present instance and an approach or attainment of the preferred orientation is realized in the instance of plating as outlined herein with the magnetic field being in effect during the operation.

Although heretofore it was believed that magnetic plating with good characteristics could be produced only by the use of uniform and limited base material upon which the coating was deposited in the present instance, it will be noted to the contrary, that the plating, although it is continuous over various metallic and resinous background material, it is still effective as a magnetic switching device.

Another departure from the prior art is found in the comparatively wide range of electrolyte pH and the current density now used but which was though critical in order to produce preferred orientation. Now with the use of metallic control, it is found the deposition of magnetic material in the preferred plane is obtained without having the deposition procedures held with impractical tolerances.

In accordance with the recited mode of depositing metallic material the orientation is such that a crystal axis appears at right angles to the surface parallel to the direction of current. From this it is apparent that the formed core material will be magnetized rapidly and assume a switched condition in an unusual fashion.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A magnetic storage matrix comprising:
a flat nonconductive substrate wtih a grid of separate memory areas formed by rows and columns of closely spaced pairs of slot openings, there being between each pair of openings a separate memory area strip receptive to cylindrical deposits,
a plurality of sets of printed conductors on said substrate with conductors of different sets grouped over each of said strips in a memory area,
and cylindrical thin films of magnetic material deposited on said separate strips over said conductors as separate memory elements, said material being of a nature exhibiting square loop hysteresis characteristics.

2. An automated magnetic core memory array comprising:
a square flat sheet of insulation with regularly spaced and aligned rows and columns of narrow elongated strips of insulation between pairs of adjacent related slot openings, there being larger connective insulation areas other than said strips between unrelated slots,
said sheet bearing on both faces a plurality of sets of printed circuit lines which run in groups across both faces of said elongated strips and end with enlarged terminal areas at the edges of said sheet, each group on a strip including lines of all different sets of lines,
a coat of plastic on said array, cylindrical films of preliminary nonmagnetic metal on said plastic coated strips,
and outer magnetic core films restricted to deposits encircling said elongated strips with a nickel-iron composition having magnetic square loop hysteresis characteristics.

References Cited in the file of this patent

UNITED STATES PATENTS

| | | |
|---|---|---|
| 2,671,950 | Sukacev | Mar. 16, 1954 |
| 2,683,839 | Beck | July 13, 1954 |
| 2,734,150 | Beck | Feb. 7, 1956 |
| 2,792,563 | Rajchman | May 14, 1957 |
| 2,877,540 | Austin | Mar. 17, 1959 |
| 2,878,463 | Austin | Mar. 17, 1959 |
| 2,882,519 | Wallentine | Apr. 14, 1959 |
| 2,901,736 | Sylvester | Aug. 25, 1959 |
| 2,907,988 | Duinker | Oct. 6, 1959 |
| 2,970,296 | Horton | Jan. 31, 1961 |
| 3,030,612 | Rubens et al. | Apr. 17, 1962 |

FOREIGN PATENTS

| | | |
|---|---|---|
| 199,908 | Austria | Oct. 10, 1958 |
| 868,775 | Great Britain | May 25, 1961 |
| 1,190,683 | France | Dec. 7, 1956 |

OTHER REFERENCES

"A Compact Coincident-Current Memory," A. V. Pohm, S. M. Rubens, Proceedings of the Eastern Joint Computer Conference, December 10–12, 1956, pp. 120–123.